(12) United States Patent
Willms (10) Patent No.: US 7,663,482 B1
(45) Date of Patent: *Feb. 16, 2010

(54) TRACKING AND PROCESSING CARGO CONTAINERS HAVING INDEFINITE SECURITY STATUS

(75) Inventor: Paul H Willms, Everett, WA (US)

(73) Assignee: Erudite, Inc., Tacoma, WA (US)

( * ) Notice: Subject to any disclaimer, the term of this patent is extended or adjusted under 35 U.S.C. 154(b) by 31 days.

This patent is subject to a terminal disclaimer.

(21) Appl. No.: 12/001,177

(22) Filed: Dec. 10, 2007

Related U.S. Application Data (63) Continuation of application No. 11/063,436, filed on Feb. 22, 2005, now Pat. No. 7,312,702.

(51) Int. Cl.
*G08B 21/00* (2006.01)

(52) U.S. Cl. ...................................... 340/540

(58) Field of Classification Search ................. 340/540, 340/5.81, 545.6, 539.13, 572.1; 705/1
See application file for complete search history.

(56) References Cited

U.S. PATENT DOCUMENTS 7,002,472 B2 * 2/2006 Stratmoen et al. ...... 340/539.26
2005/0099292 A1 * 5/2005 Sajkowsky ............. 340/539.13
2005/0197844 A1 * 9/2005 Ng et al. ........................ 705/1
2006/0033616 A1 * 2/2006 Silva et al. ............. 340/539.22

* cited by examiner

*Primary Examiner*—Phung Nguyen
(74) *Attorney, Agent, or Firm*—Boris G. Tankhilevich (57) ABSTRACT

A method of tracking and processing at least one cargo container having an indefinite security status (ISS). In one embodiment, the method of the present invention comprises: (A) detecting at least one statistically significant threat (SST) signal associated with at least one cargo container while in transit; (B) if at least one such SST signal was detected, identifying each cargo container that generated at least one such SST signal and classifying the security status of each such cargo container as a Potential Threat (PT) cargo container; (C) substantially continuously checking at least one generated SST signal to verify the security status of at least one PT container while in transit; (D) if at least one SST signal is confirmed to be a false positive SST signal, changing the security status of at least one PT container associated with the false positive SST signal to an indefinite security status (ISS) cargo container; and (E) tracking and reporting position coordinates and security status of each ISS PT cargo container to an appropriate party.

20 Claims, 7 Drawing Sheets

TRACKING AND PROCESSING CARGO CONTAINERS HAVING INDEFINITE SECURITY STATUS

This is a continuation of the parent application Ser. No. 11/063,436 filed Feb. 25, 2005, now U.S. Pat. No. 7,312,702 entitled: "EXPEDITING RELEASE PROCEDURE OF CARGO CONTAINER AT BORDER CROSSING OR AT CUSTOMS ENTRY POINT BY TRACKING AND REPORTING THREATS WHILE CARGO CONTAINER IS IN TRANSIT".

BACKGROUND OF THE INVENTION

1. Field of the Invention

The current invention relates to Homeland Security, and, more specifically, to expediting release procedure of cargo containers at border crossing or at customs entry point by tracking and reporting threats while cargo containers are in transit.

2. Discussion of the Prior Art

The parent patent application disclosed a method of expediting a release procedure of at least one cargo container at least one border crossing or at least one customs entry point by detecting each statistically significant threat (SST) signal associated with at least one said cargo container while in transit, and by tracking and reporting to an appropriate party the position coordinates and a security status of each cargo container that generated at least one said SST signal.

SUMMARY OF THE INVENTION

The present invention addresses the problem of tracking and processing cargo containers having indefinite security status (ISS).

One aspect of the present invention is directed to a method of tracking and processing at least one cargo container having an indefinite security status (ISS).

In one embodiment, the method of the present invention comprises: (A) detecting at least one statistically significant threat (SST) signal associated with at least one cargo container while in transit; wherein each SST signal generates a threat signal having a threat probability higher than a predetermined threshold; (B) if at least one SST signal associated with at least one cargo container while in transit was detected, identifying each cargo container that generated at least one SST signal and classifying the security status of each such cargo container as a Potential Threat (PT) cargo container; (C) substantially continuously checking said at least one generated SST signal to verify the security status of at least one PT container while in transit; (D) if at least one SST signal is confirmed to be a false positive SST signal, changing the security status of at least one PT container associated with false positive SST signal to an indefinite security status (ISS) cargo container; and (E) tracking and reporting position coordinates and security status of each ISS PT cargo container to an appropriate party; wherein the appropriate party is selected from the group consisting of: {Homeland Security agency; and a cargo security agency}.

Another aspect of the present invention is directed to a method of tracking and reporting position coordinates and security status of an Expedited Release Procedure (ERP) cargo container that changed its status to an ISS cargo container while in transit.

In one embodiment, the method of the present invention comprises: (A) substantially continuously checking the security status of each ERP container while in transit by using at least one threat detector to detect a previously undetected (PU) SST signal; (B) if at least one ERP container generates a previously undetected (PU) SST signal, changing the security status of at least one ERP container associated with the (PU) SST signal to an indefinite security status (ISS) cargo container; and (C) tracking and reporting position coordinates and security status of each such ISS cargo container associated with the (PU) SST signal to an appropriate party; wherein the appropriate party is selected from the group consisting of: {Homeland Security agency; and a cargo security agency}.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The parent patent application invention addressed the issue of how to expedite a release procedure of cargo containers at border crossings, and/or at customs entry points, and at the same time, to guarantee a high level of Homeland Security from any threat originated from any cargo container that arrives to the USA by sea.

The disclosed in the parent patent application Web-Based system and method that enables an expedient release procedure of cargo containers at border crossings, and/or at customs entry points, and at the same time, guarantees a high level of Homeland Security from any threat originated from any cargo container that arrives to the USA by sea, is based on the early detection of each statistically significant threat (SST) signal associated with at least one cargo container while in transit, and by tracking and reporting to each appropriate party the position coordinates and a security status of each cargo container that generated at least one SST signal. The SST signal is defined as a threat signal with a substantially high probability of being, indeed, a signal that indicates a real threat to the Homeland security originated from at least one cargo container while in transit.

The U.S. Pat. No. 7,151,447, issued to Paul Willms and Jim Stanley, is hereafter referred to as the patent #1. Each such threat considered in the patent #1 is assumed to be either hidden inside at least one cargo container before transit, or is assumed to be placed inside at least one cargo container while in transit. Each threat considered in the patent #1, while interacting with its surrounding, generates a unique threat signature. The patent #1 discloses how to select an array of statistically significant detected threat signatures by measuring a background threat signature distribution in a threat-free environment, by comparing each detected threat signature signal with the background threat signature distribution, and if deviation of the detected threat signature signal from the background threat signature distribution is statistically significant, how to select the array of the statistically significant detected threat signatures for further processing. To determine the likelihood of identifying each threat as a threat to the Homeland Security, the patent #1 suggests the following steps: generating a statistically significant threat (SST) signal corresponding to each detected threat signature having the statistically significant deviation from the background threat signature distribution, consulting a database of predetermined thresholds associated with a plurality of known threat signatures, comparing each statistically significant threat (SST) signal with at least one predetermined threshold associated with the plurality of known threats, and selecting each statistically significant threat (SST) signal that exceeds at least one predetermined threshold associated with the plurality of known threats into an N-array of threats, wherein the N-array includes an integer number N of statistically significant threat (SST) signals exceeding at least one predetermined threshold. If the integer number N of statistically significant threat (SST) signals exceeding at least one predetermined threshold and selected into the N-array exceeds a predetermined number $N_{array\_threshold}$, one can determine the likelihood of each threat to generate at least one statistically significant threat (SST) signal. If the likelihood of at least one threat exceeds a predetermined threshold, each threat is identified as a real threat to the Homeland Security.

The U.S. Pat. No. 7,180,418 is hereafter referred to as the patent #2. The patent #2 discloses a method of active detection of at least one threat to the homeland security, each threat is assumed to be either hidden inside at least one cargo container before transit, or is assumed to be placed inside at least one cargo container while in transit, each threat while interacting with its surrounding generates a unique threat signature. The method of the patent #2 comprises the steps of substantially continuously probing each cargo container to detect at least one threat signature, processing each detected threat signature to identify the statistically significant threat (SST) signals, identifying at least one container that generates such SST signals; and eliminating such threat to the homeland security, if feasible. Based on the disclosure given in the patent #1 and in the patent #2, each statistically significant threat (SST) signal that is discussed in the current patent application is generated by either using the active probing method of the patent #2, or by using the passive threat detection devices of the patent #1.

Figure 1:
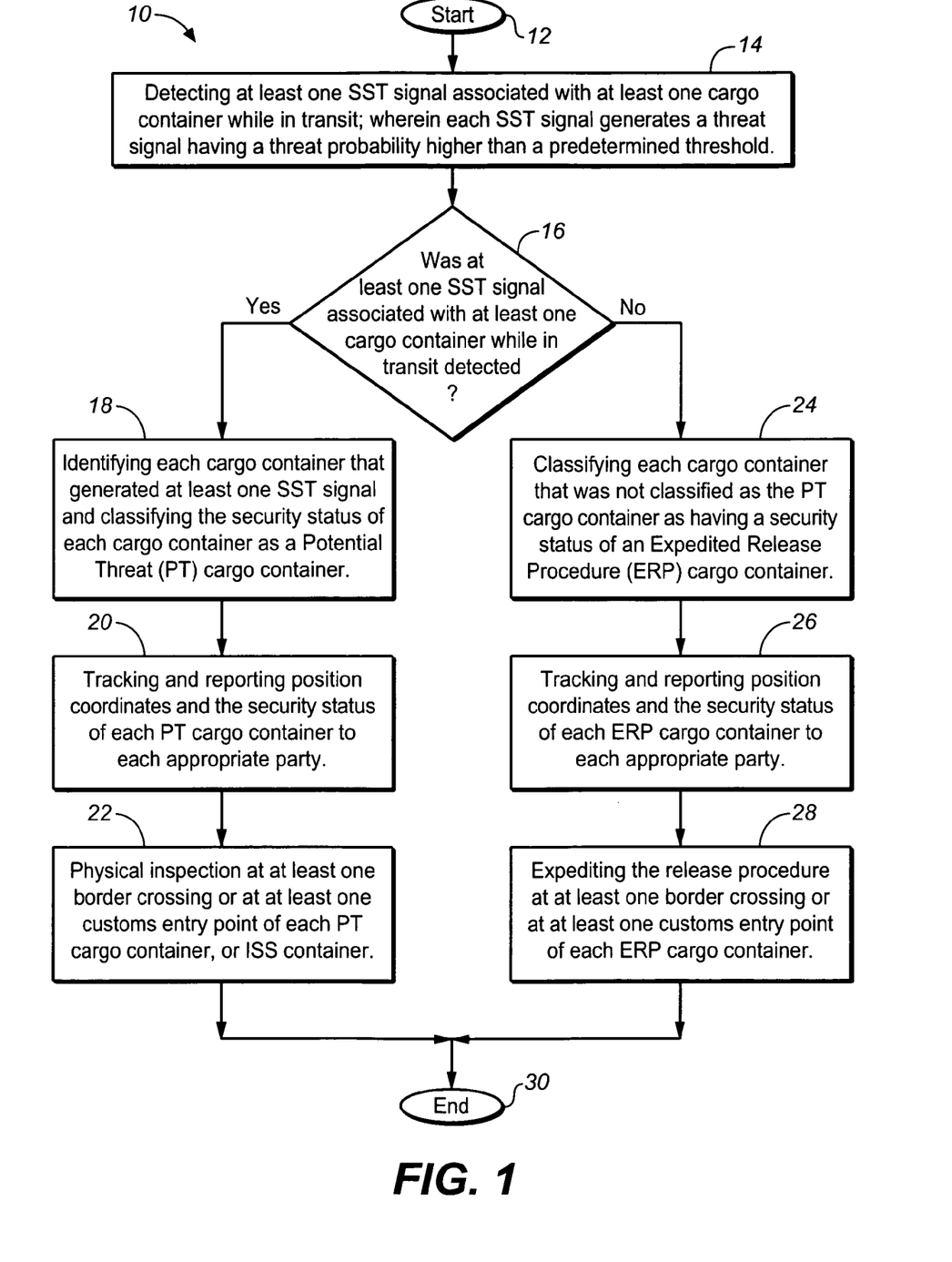
FIG. 1 illustrates the flow chart of the method of the parent patent application of expediting the release procedure of cargo containers at a border crossing or at a customs entry point by tracking and reporting (SST) signals while cargo containers are in transit.

In one embodiment, FIG. 1 illustrates the flow chart 10 of the method of the parent patent application of expediting the release procedure of cargo containers at a border crossing or at a customs entry point by tracking and reporting (SST) signals while cargo containers are in transit. The flow chart 10 includes the step of detecting at least one SST signal associated with at least one cargo container while in transit (step 14). The test condition 16 has two solutions: Yes and No. If the test condition 16 is satisfied (solution Yes), that is if at least one SST signal associated with at least one cargo container while in transit was detected, the flow chart 10 has the following steps: (step 18) identifying each cargo container that generated at least one SST signal and classifying the security status of each cargo container as a Potential Threat (PT) cargo container; (step 20) tracking and reporting position coordinates and the security status of each PT cargo container to each appropriate party; and (step 22) performing a physical inspection of each PT cargo container, or some of the indefinite security status (ISS) containers at a border crossing or at a customs entry point.

The present invention is directed to a method of tracking and processing at least one cargo container having an indefinite security status (ISS). Please, see full discussion below.

The appropriate party is selected from the group consisting of: {Homeland Security agency; and a cargo security agency}; wherein the cargo security agency is further selected from the group consisting of: {a consignee; a steamship line; a customs broker; a freight forwarder; and a terminal operator}.

Customs has a variety of inspections on its "menu of options":

(I) Intensive exam: Container is unloaded (partially or fully) and cargo is physically inspected.

(II) Tailgate exam: (usually done by Special Enforcement Teams or by US Dept of Agriculture). The container is opened and government agency 'looks' inside (sometimes uses a canine) for evidence of drugs, stowaways, harmful plants or insects, obvious manifest miss-declarations (i.e. manifest calls for toys and the container is filled with computers).

(III) VACIS Exam (Vehicle and Cargo Inspection System): customs runs the entire sealed container through an X-ray machine.

(IV) Documents Required exam: Customs and Border Protection (CBP) reviews and inspects the commercial and shipping documents, but generally does not want to do a physical inspection of the cargo.

Referring still to FIG. 1, if, on the other hand, the test condition 16 is not satisfied (Solution No), that is none of the SST signals associated with at least one cargo container while in transit was detected, the flow chart 10 has the following steps: (step 24) classifying each cargo container that was not classified as a PT cargo container as a cargo container having a security status of an Expedited Release Procedure (ERP) cargo container; (step 26) tracking and reporting position coordinates and the security status of each ERP cargo container to each appropriate party; and (step 28) expediting the release procedure at least one border crossing or at least one customs entry point of each ERP cargo container.

In general, each container is assumed to be equipped with a Smart Container Lock/Strongbox device comprising at least one active threat detector as disclosed in the patent #2, at least one passive threat detector as disclosed in the patent #1, a tracking/navigation/device, a reporting means, a programmable locking device, and a communication means having an access to the Internet (not shown).

The step (14 of flow chart 10 of FIG. 1) of detecting at least one SST signal associated with at least one cargo container while in transit further comprises the following steps (not shown): using at least one threat detector to detect at least one SST signal associated with at least one cargo container while in transit; and using at least one detected SST signal to activate at least one RFID tag attached to at least one cargo container associated with at least one detected SST signal. An activated RFID tag is used to identify and locate a cargo (step 18 of FIG. 1) container that generated the detected SST signal and to classify the security status of each such cargo container as the Potential Threat (PT) cargo container.

The step of tracking and reporting position coordinates and security status of each PT cargo container to the appropriate party (step 20 of FIG. 1) further comprises the step of using a radio navigational equipment (not shown) to substantially continuously determine and track position coordinates of each PT container. Similarly, the step of tracking and reporting position coordinates and the security status of an ERP cargo container to each appropriate party (step 26 of FIG. 1) further comprises the step (not shown) of using a radio navigational equipment to substantially continuously determine and track position coordinates of each ERP container.

The radio navigational equipment is selected from the group consisting of: {a GPS navigational processor; a GLONASS navigational processor; a combined GPS/GLONASS navigational processor; a GALILEO navigational processor; a Global Navigational Satellite System (GNSS) navigational processor; and a pseudolite navigational processor}.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular.

The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency $f1=1575.42$ MHz (approximately nineteen centimeter carrier wavelength) and an L2 signal having a frequency $f2=1227.6$ MHz (approximately twenty-four centimeter carrier wavelength). These two frequencies are integral multiplies $f1=1{,}540$ $f0$ and $f2=1{,}200$ $f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1.246+7\ k/16)$ GHz, where $k=(1, 2, \ldots 24)$ is the channel or satellite number. These frequencies lie in two bands at 1.597-1.617 GHz (L1) and 1,240-1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

As disclosed in the European Commission "White Paper on European transport policy for 2010", the European Union will develop an independent satellite navigation system Galileo as a part of a global navigation satellite infrastructure (GNSS).

The GALILEO system is based on a constellation of 30 satellites and ground stations providing information concerning the positioning of users in many sectors such as transport (vehicle location, route searching, speed control, guidance systems, etc.), social services (e.g. aid for the disabled or elderly), the justice system and customs services (location of suspects, border controls), public works (geographical information systems), search and rescue systems, or leisure (direction-finding at sea or in the mountains, etc.).

The range of GALILEO services is designed to meet practical objectives and expectations, from improving the coverage of open-access services in urban environments (to cover 95% of urban districts compared with the 50% currently covered by GPS alone) which will benefit the 160 million private vehicles in Europe, or enabling the use of satellite navigation applications "indoors", in buildings and even in tunnels, or indeed mobile telephone services based on identifying the caller's position.

A pseudolite comprises a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands, or in a radio location band such as the (9.5-10) GHz band. Pseudolites can be used for enhancing the GPS by providing increased accuracy, integrity, and availability.

The complete description of the pseudolite transmitters in GPS band can be found in 'Global Positioning System: Theory and Applications; Volume II", edited by Bradford W. Parkinson and James J. Spilker Jr., and published in Volume 164 in "PROGRESS IN ASTRONAUTICS AND AERONAUTICS", by American Institute of Aeronautic and Astronautics, Inc., in 1966.

In ISM band, including 900 MHZ, 2.4 GHz, or 5.8 GHz bands, the user can own both ends of the ISM communication system. The ISM technologies are manufactured by Trimble Navigation Limited, Sunnyvale, Calif. Metricom, Los Gatos, Calif. and by Utilicom, Santa Barbara, Calif.

Pseudolites as radio positioning systems can be configured to operate in ISM band.

Referring still to FIG. 1, the step of tracking and reporting position coordinates and security status of each PT cargo container to an appropriate party (step 20 of FIG. 1) further comprises the step of generating an alarm signal (not shown) when at least one container was identified as a PT container while in transit. This step provides some early warning signal to a crew of the cargo ship while in transit.

The step of tracking and reporting position coordinates and security status of each PT cargo container to an appropriate party (step 20 of FIG. 1) further comprises the following steps (not shown): checking at least one generated SST signal to verify the security status of at least one PT container while in transit; and if at least one SST signal is confirmed to be a false positive SST signal, changing the security status of at least one PT container associated with the false positive SST signal to an indefinite security status (ISS) cargo container. This step provides an extra assurances that the security status of a PT container will be either confirmed, or changed to an ERP status. The present invention, as was stated above, is focused on tracking of the (ISS) PT cargo containers.

Similarly, the step (26 of FIG. 1) of tracking and reporting position coordinates and security status of an ERP cargo container to an appropriate party further comprises the steps (not shown) of substantially continuously checking the security status of each ERP container while in transit by using at least one threat detector to detect a previously undetected (PU) SST signal; and if at least one ERP container generates a previously undetected (PU) SST signal, changing the security status of at least one ERP container associated with the PUSST signal to an indefinite security status (ISS) cargo container. The present invention is also focused on tracking of at least one ERP container that generates a previously undetected (PU) SST signal.

In one embodiment of the present invention, more specifically, the step of changing the security status of at least one ERP container associated with the previously undetected (PU) SST signal to an indefinite security status (ISS) cargo container further comprises the following steps (not shown): activating at least one RFID tag associated with the (PU) SST signal to indicate the change in the classification of at least one cargo container from the ERP security status to the ISS security status; and generating an alarm signal when at least one ERP container changes its security status from the ERP security status to the ISS security status.

Based on the disclosed above specific steps, more broadly, the step of tracking and reporting position coordinates and security status of each PT cargo container to an appropriate party (step 20 of FIG. 1) further comprises the step (not shown) of substantially continuously updating and reporting an electronic identity of each PT container. In one embodiment of the present invention, the electronic identity of a PT container comprises a plurality of parameters selected from the group consisting of: {a security status of the PT container; an alarm event associated with the PT container; an electronic transmission to each appropriate party of an alarm event associated with the PT container; and a change in security status of the PT container due to a false positive SST signal to an ISS status}.

Similarly, the step (26) of tracking and reporting position coordinates and security status of an ERP cargo container to each appropriate party further comprises the step (not shown) of substantially continuously updating and reporting an electronic identity of the ERP container. The electronic identity of an ERP container comprises a plurality of parameters selected from the group consisting of: {a security status of the ERP container; a change in security status of the ERP container due to a PUSST signal; an alarm event associated with the PUSST signal; and an electronic transmission to each appropriate party of the alarm event associated with the PUSST signal}.

The step of tracking and reporting position coordinates and security status of a PT cargo container to each appropriate party (step 20 of FIG. 1) further comprises the step (not shown) of reporting the position coordinates of the PT container by using a reporting means. Similarly, the step (26 of FIG. 1) of tracking and reporting position coordinates and security status of an ERP cargo container to an appropriate party further comprises the step (not shown) of reporting the position coordinates of each ERP container by using a reporting means. The reporting means is selected from the group consisting of: {a cellular phone; a radio; a TV transmitter; a satellite phone; a cable; and a website/portal of the ERP website-based system}.

Homeland Security with the Coast Guard is currently using ORBCOMM's satellites for ocean vessel tracking in some way. The same ORBCOMM's satellites technology can be used in the present invention for reporting purposes. ORBCOMM, located at 21700 Atlantic Boulevard, Dulles, Va. 20166 USA, is a satellite data communications company that provides innovative satellite communication services at down to earth prices. The satellite-based network provides customers around the world with reliable global coverage and the added value of tailored application service and support. The ORBCOMM System uses low-Earth orbit (LEO) satellites to provide cost-effective tracking, monitoring and messaging capabilities to and from anywhere in the world. Similar to two-way paging or e-mail, the ORBCOMM's system is capable of sending and receiving two-way alphanumeric packets of data. These short, economical messages increase the efficiency of remote operations by making critical information readily available, often from areas beyond the geographic and economic reach of traditional systems.

Figure 2:
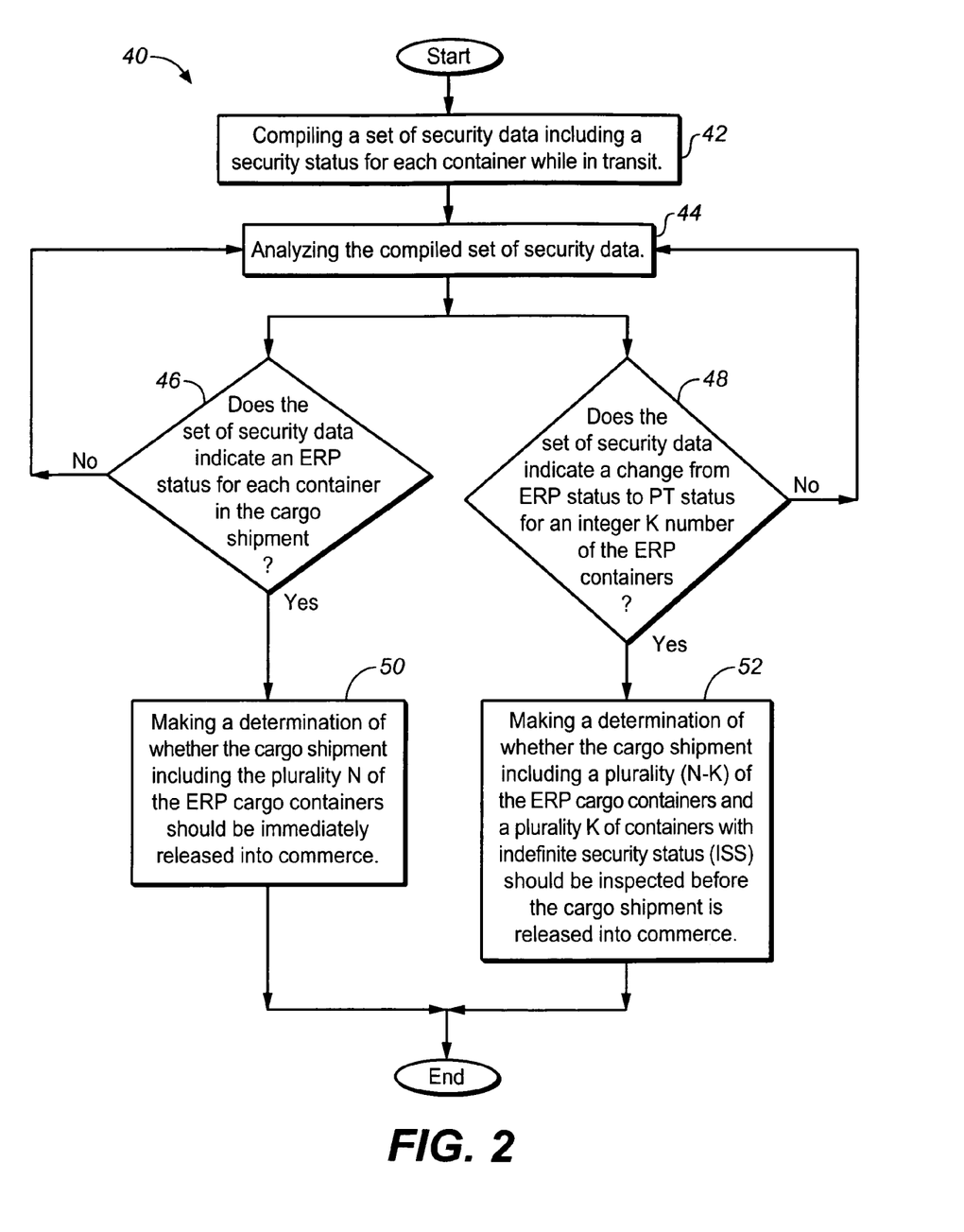
FIG. 2 is a flow chart that details the step of expediting the release procedure at at least one border crossing or at least one customs entry point of an ERP cargo container.

FIG. 2 is a flow chart 40 that details the step (28 of FIG. 1) of expediting the release procedure at least one border crossing or at least one customs entry point of an ERP cargo container.

More specifically, the step (28 of FIG. 1) further comprises the following steps: (step 42) compiling a set of security data including a security status for each container while in transit; (step 44) analyzing the set of security data compiled in the step (42); and if the test condition 46 is satisfied, that is, if the set of security data indicates an ERP status for each container in the cargo shipment, making a determination of whether the cargo shipment including the plurality N of the ERP cargo containers should be immediately released into commerce (step 50).

If, on the other hand, the test condition 48 is satisfied, that is the set of security data indicates a change from ERP status to PT status for an integer K number of the ERP containers, the flow chart 40 of FIG. 2 includes the step of making a determination of whether the cargo shipment including a plurality (N-K) of the ERP cargo containers and a plurality K of containers with indefinite security status (ISS) should be inspected before the cargo shipment is released into commerce (step 52).

Figure 3:
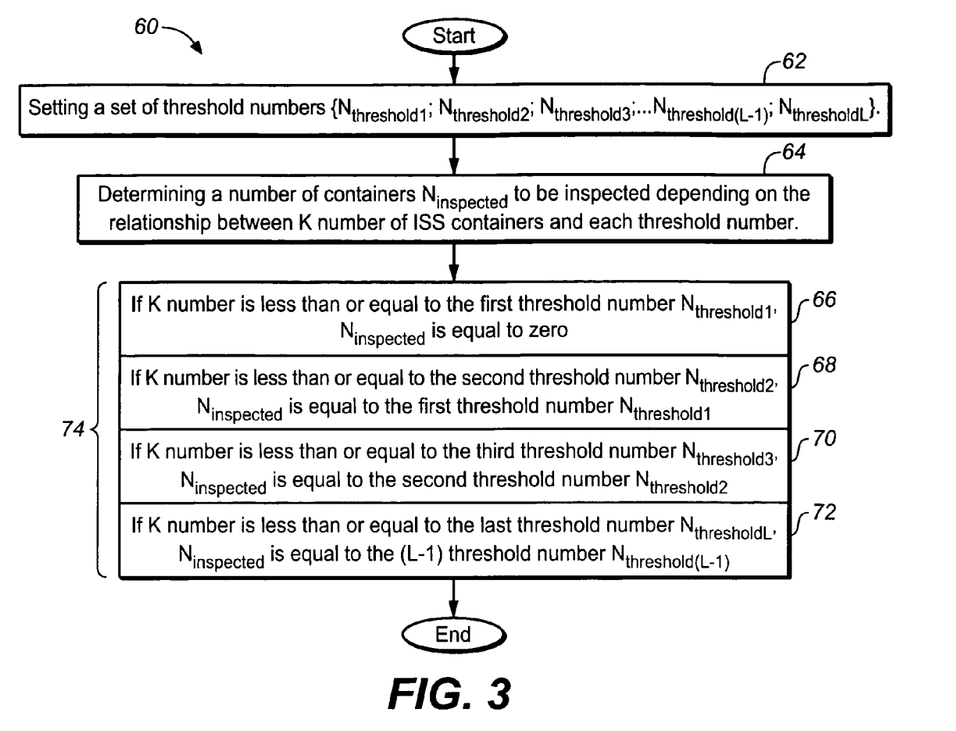
FIG. 3 illustrates a flow chart of the step of making the determination of whether the cargo shipment including the plurality (N-K) of ERP cargo containers and the plurality K of ISS containers should be inspected before the cargo shipment is released into commerce in more details.

FIG. 3 is a flow chart 60 that illustrates in more details the step of making the determination of whether the cargo shipment including the plurality (N-K) of ERP cargo containers and the plurality K of ISS containers should be inspected before the cargo shipment is released into commerce.

More specifically, the flow chart 60 of FIG. 3 includes the following steps: (step 62) setting a set of threshold numbers; and (step 64) determining a number of containers $N_{inspected}$ to be inspected depending on the relationship between K number of ISS containers and each threshold number. In more details, the flow chart 60 includes the following steps: (step 62) setting a set of threshold numbers $\{N_{threshold1}; N_{threshold2}; N_{threshold3}; \ldots N_{threshold(L-1)}; N_{thresholdL}\}$; L is an integer; and (step 64) determining a number of containers $N_{inspected}$ to be inspected depending on the relationship between K number of ISS containers and each threshold number. $N_{inspected}$ is equal to zero if K number is less than or equal to the first threshold number $N_{threshold1}$ (box 66); $N_{inspected}$ is equal to the first threshold number $N_{threshold1}$ if K number is less than or equal to the second threshold number $N_{threshold2}$ (box 68); $N_{inspected}$ is equal to the second threshold number $N_{threshold2}$ if K number is less than or equal to the third threshold number $N_{threshold3}$ (box 70); and $N_{inspected}$ is equal to the (L−1) threshold number $N_{threshold(L-1)}$ if K number is less than or equal to the last threshold number $N_{thresholdL}$ (box 72).

Referring still to FIG. 1, the step (28) of expediting the release procedure at least one border crossing or at least one customs entry point of each ERP cargo container further comprises the step (not shown) of using a secure ERP web-site-base system to expedite the release procedure at least one border crossing or at least one customs entry point of each ERP cargo container.

The secure ERP website-based system is configured to collect and to process a set of combined data selected from the group consisting of: {a set of normal commercial transaction data; a set of transport data; a set of RFID data; a set of satellite navigational tracking data; a set of threat signal data; and a set of security status data}. The set of combined data is a collection of inputs from a supply chain selected from the group consisting of: {each container entering at least one border crossing or at least one customs entry point; the customs at least one destination country; a network of shippers; a network of consignees; a network of forwarders; a plurality of terminals; and a network of carriers}.

The secure ERP web-site based system is configured to expedite the release procedure at least one border crossing or at least one customs entry point of each ERP cargo container. The secure ERP web-site based system performs the following steps: utilizing the set of data selected from the group consisting of: {the RFID data; the set of satellite navigational tracking data; and the set of threat signal data} to indicate a physical location of at least one ISS cargo container that will be submitted for customs clearance within a predetermined distance and time of arrival from a port of discharge and/or port of entry; and using the secure ERP website-based system configured to enable the preparation and population of a set of ERP data documentation for the expedite release procedure for each ERP cargo container including a set of data selected from the group consisting of: {a set of commercial invoices; a set of packing lists; a set of manifests; a set of Bills of Lading; a set of commercial documents including a certificate of origin, manufacturer safety data sheets, pre-shipment cargo inspection reports, documentary collections, quota certificates, solid wood packing declarations; and a set of customs entry data}.

The current location of each ISS cargo container that generated at least one previously undetected SST (PUSST) signal is posted on the secure ERP website.

In one embodiment of the present invention, a predetermined number of the ISS cargo containers in the cargo shipment should be physically inspected at at least one border crossing or at least one customs entry point or at port of customs entry. On the other hand, each ERP cargo container is immediately released into the stream of commerce without being physically inspected at the border crossing or at least one customs entry point.

Figure 4:
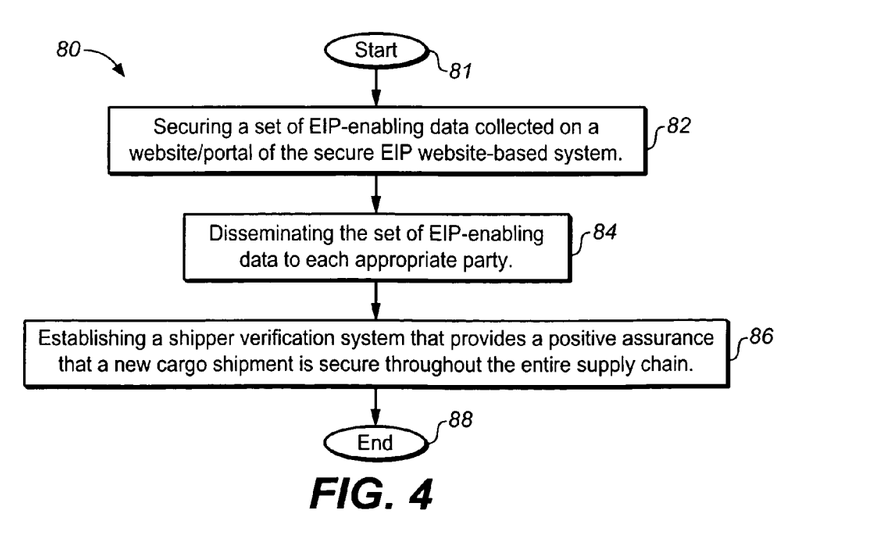
FIG. 4 is a flow chart that illustrates the usage of the secure ERP website-based system configured to enable the preparation and population of the set of ERP data documentation for the expedite release procedure for each ERP cargo container in more details.

FIG. 4 is a flow chart 80 that illustrates in more details the usage of the secure ERP website-based system configured to enable the preparation and population of the set of ERP data documentation for the expedite release procedure for each ERP cargo container.

More specifically, the flow chart 80 includes the step of securing a set of ERP-enabling data collected on a website/portal of the secure ERP website-based system (step 82); the step of disseminating the set of ERP-enabling data to an appropriate party (step 84); and the step of establishing a shipper verification system that provides a positive assurance that a new cargo shipment is secure throughout the entire supply chain (step 86). The ERP-enabling data is selected from the group consisting of: {a consignee data including a customs broker data; a shipper data; a carrier data including a port/terminal data from the port of departure; and a customs/Automated Brokerage Interface (ABI)/Other Governmental Agency (OGA) data}.

The ERP-enabling data comes from each appropriate party located anywhere in the world, whereas an appropriate party is selected from the group consisting of: {the consignee; a customs broker; the shipper; the carrier; the port and terminal operator; the customs; a designated agent of the consignee; a designated agent of the customs broker; a designated agent of the shipper; a designated agent of the carrier; a designated agent of the port and terminal operator; and a designated agent of the customs}.

Figure 5:
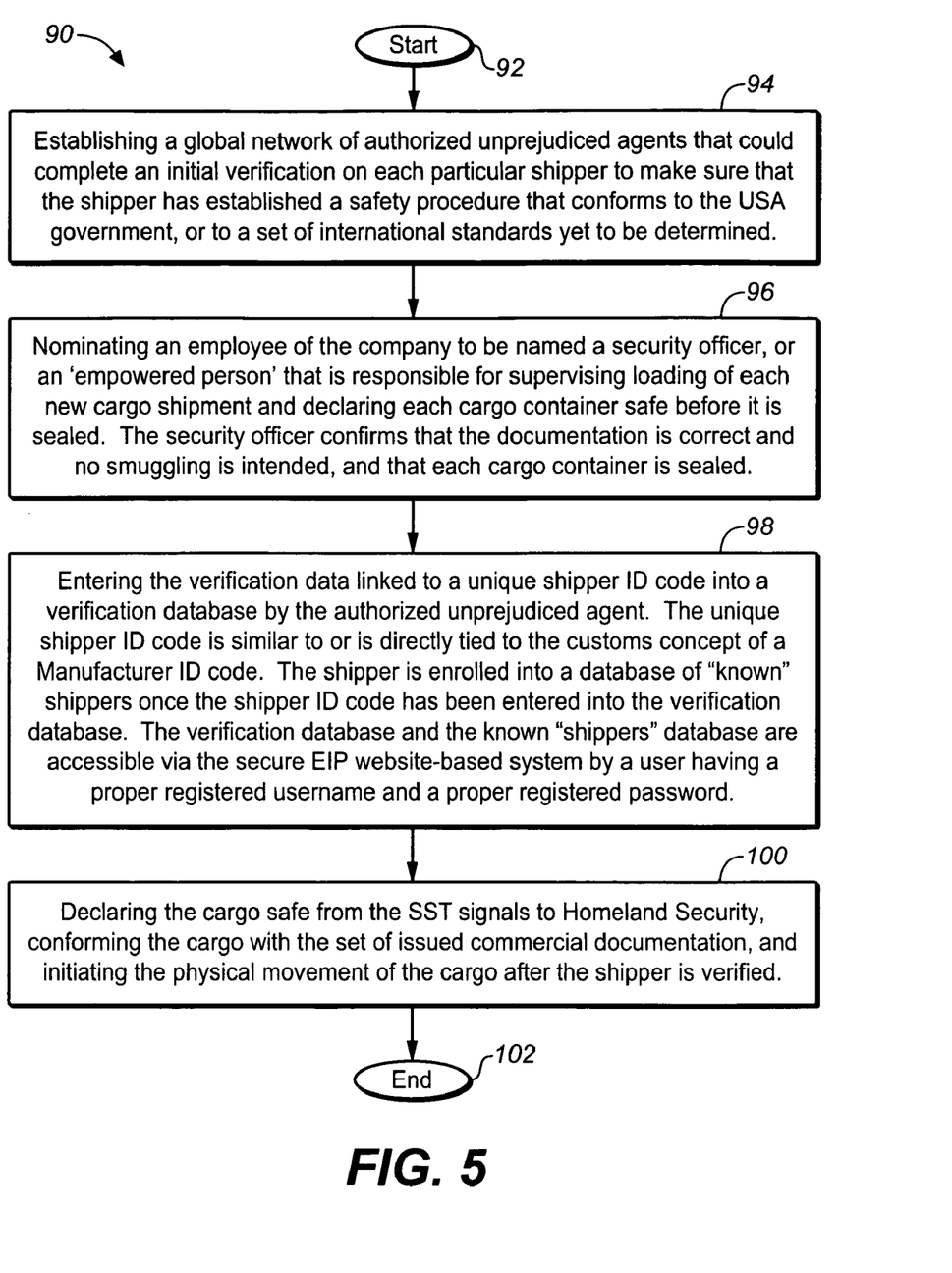
FIG. 5 illustrates a flow chart of establishing the shipper verification system in more details.

FIG. 5 illustrates a flow chart 90 of establishing the shipper verification system in more details. In order to provide positive assurance that the cargo is secure throughout the entire supply chain, it should be verified as being 'safe' before the container is sealed. The present invention establishes a procedure that would be endorsed or mandated by the Customs and Border Protection (CBP), and that would establish a global network of authorized agents that would complete an initial verification visit on a shipper. This initial verification procedure would positively verify that the would-be shipper has established safety procedures that conform to government standards such as C-TPAT (Customs and Trade Partnership Against Terrorism) (step 94 of FIG. 5), and would nominate an employee of the company to be the named security officer or empowered person that is responsible for supervising loading and declaring containers safe before they are sealed (step 96 of FIG. 5).

The agent would enter the verification data into a database (step 98 of FIG. 5). This data could be linked to a unique shipper id code such as the Manufacturer ID Code. The shipper would keep records of the verification process. Once the shipper is verified and established in the database, he will be a "known" shipper to US Government. The appointed network of agents will be entitled and mandated to make periodical surprise visits at the shipper to ensure ongoing compliance with the program.

Assuming the shipper is verified, he will load the cargo and declare if it is safe (step 100 of FIG. 5). He will then immediately seal the container with a smart container seal. Containers that arrive at the border with seal intact and no alarm events that occurred in transit could be fast tracked through the clearance process.

Referring still to FIG. 5, more broadly, the flow chart 90 includes the following step: (step 94) establishing a global network of authorized unprejudiced agents that could complete an initial verification on each particular shipper to make sure that the shipper has established a safety procedure that conforms to the USA government, or to a set of international standards yet to be determined. At the next step 96, an employee of the company is nominated to be named a security officer, or an 'empowered person' that is responsible for supervising loading of each new cargo shipment and declaring each cargo container safe before it is sealed. The security officer confirms that the documentation is correct and no smuggling is intended. The security officer also confirms that each cargo container is sealed.

The flow chart 90 (of FIG. 5) further includes the step of entering the verification data linked to a unique shipper ID code into a verification database by the authorized unprejudiced agent (step 98). The unique shipper ID code is similar to or is directly tied to the customs concept of a Manufacturer ID code. The shipper is enrolled into a database of "known" shippers once the shipper ID code has been entered into the verification database. The verification database and the known" shippers" database are accessible via the secure ERP website-based system by a user having a proper registered username and a proper registered password.

Finally, the flow chart 90 (of FIG. 5) includes the steps of declaring the cargo safe from the SST signals to Homeland Security, conforming the cargo with the set of issued commercial documentation, and initiating the physical movement of the cargo after the shipper is verified (step 100).

Figure 6:
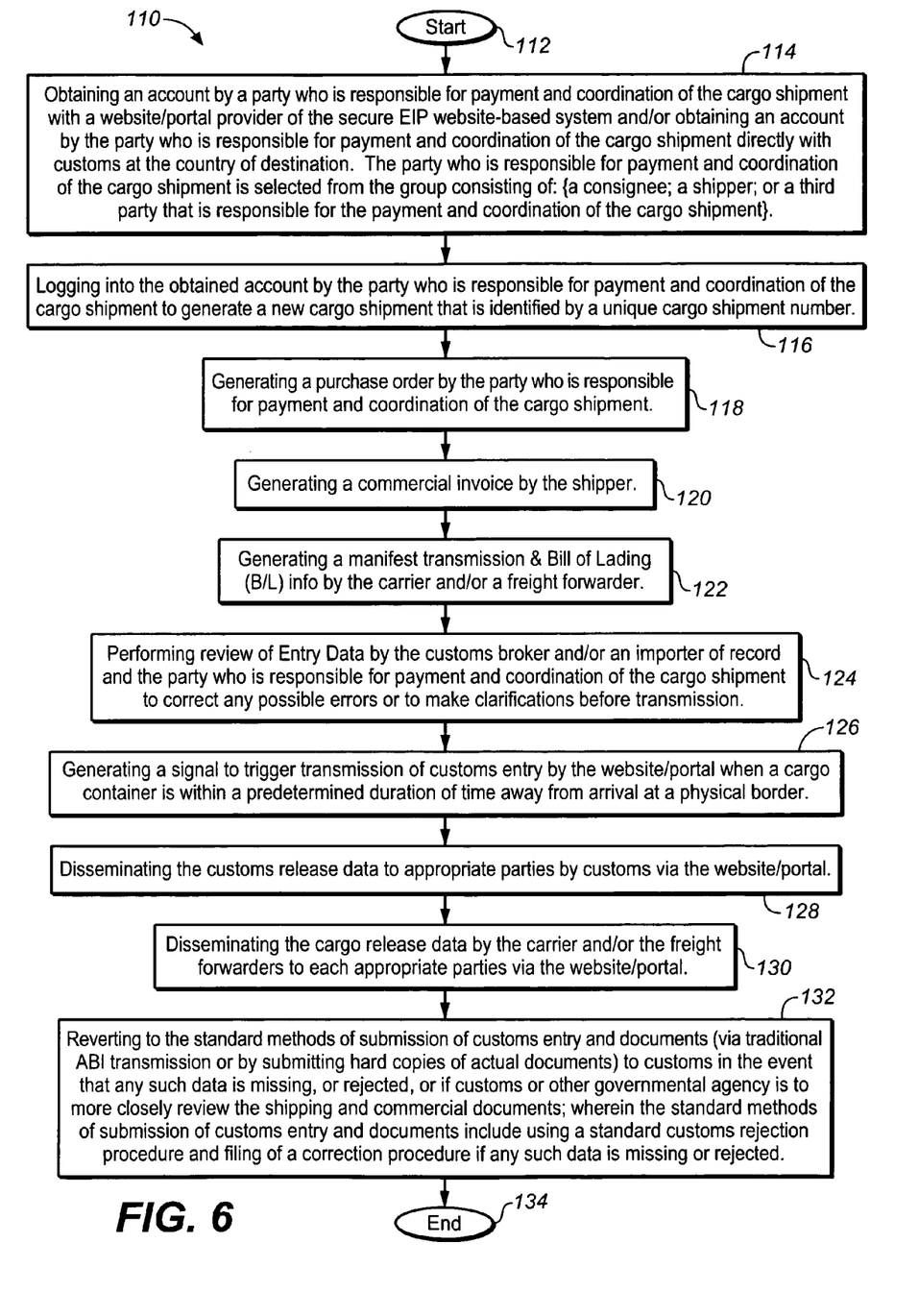
FIG. 6 depicts a flow chart that details the usage of the secure ERP website-based system configured to enable the preparation and population of the set of ERP data documentation for customs entry transmission for each ERP cargo container.

FIG. 6 depicts a flow chart 110 that details the usage of the secure ERP website-based system configured to enable the preparation and population of the set of ERP data documentation for customs entry transmission for each ERP cargo container.

The flow chart 110 comprises the step of obtaining an account by a party who is responsible for payment and coordination of the cargo shipment with a website/portal provider of the secure ERP website-based system and or/obtaining an account by the party who is responsible for payment and coordination of the cargo shipment directly with customs at the country of destination (step 114). The party who is responsible for payment and coordination of the cargo shipment is selected from the group consisting of: {a consignee; a shipper; or a third party that is responsible for the payment and coordination of the cargo shipment}.

At the next step 116, the flow chart 110 comprises the step of logging in into the obtained account by the party who is responsible for payment and coordination of the cargo shipment to generate a new cargo shipment that is identified by a unique cargo shipment number. At the step 118, a purchase order is generated by the party who is responsible for payment and coordination of the cargo shipment. At the step 120, commercial invoice is generated by the shipper. The step 122 is a step of generating a manifest transmission & Bill of Lading (B/L) info by the carrier and/or a freight forwarder. At the step 124, the review of Entry Data is performed by the customs broker and/or an importer of record and by the party who is responsible for payment and coordination of the cargo shipment to correct any possible errors or to make clarifications before transmission. The step 126 is the step of generating a signal to trigger transmission of customs entry by the website/portal of the ERP website-based system when a cargo container is within a predetermined length of time away from arrival at a physical border. At the step 128, the customs release data is disseminated to appropriate parties by customs via the website/portal of the ERP website-based system, whereas at the step 130, the cargo release data is disseminated by the carrier and or by the freight forwarders to each appropriate parties via the website/portal of the ERP website-based system.

Finally, at the step 132, the system reverts to the standard methods of submission of customs entry and documents (via traditional ABI transmission or by submitting hard copies of actual documents) to customs in the event that any such data is missing, or rejected, or if customs or other governmental agency is to more closely review the shipping and commercial documents. The standard methods of submission of customs entry and documents include using a standard customs rejection procedure and filing of a correction procedure if any such data is missing or rejected.

An account of the party who is responsible for payment and coordination of the cargo shipment is linked to a set of data selected from the group consisting of: {a predetermined PIN # and/or password; a Federal Tax ID# of the party who is responsible for payment and coordination of the cargo shipment; a Bond type; a surety code; a primary delivery warehouse; a set of delivery locations; a list or database of the Harmonized Tariff numbers for all imported goods for the party who is responsible for payment and coordination of the cargo shipment; and a set of relevant customs binding rulings}.

Certain information is not needed or used by the shipper and is typed in Italics. For Example: SKU numbers; Importer's account number including Federal Tax ID, the consignees federal tax number, delivery address, binding ruling number. Consignee or importer might not want the shipper to know where the goods are going or who they will ultimately be sold to.

Figure 7:
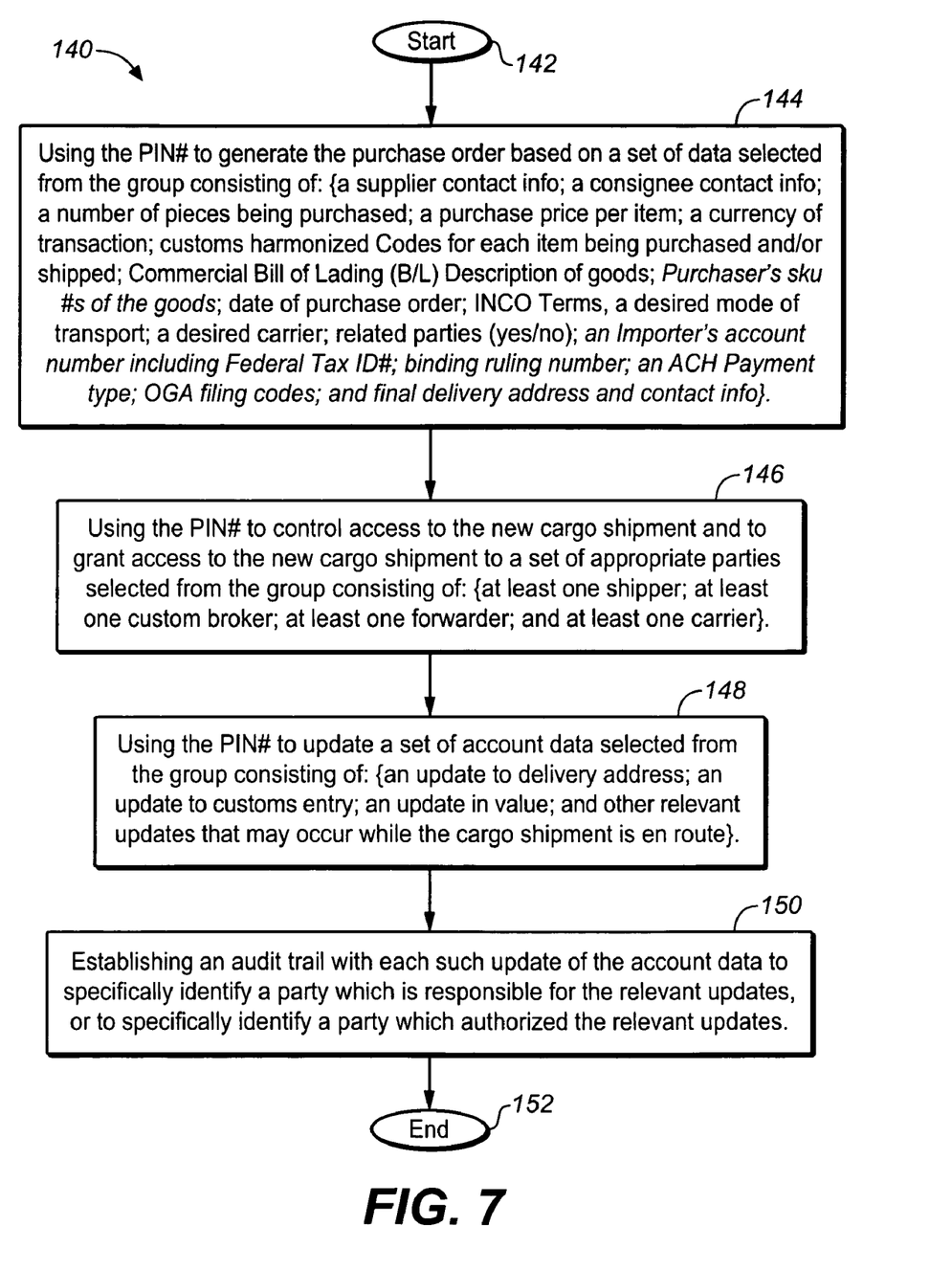
FIG. 7 is a flow chart that illustrates the step of generating a purchase order by the party who is responsible for payment and coordination of the cargo shipment in more details.

FIG. 7 is a flow chart 140 that illustrates the step of generating a purchase order by the party who is responsible for payment and coordination of the cargo shipment in more details.

At the step 144, the PIN# is used to generate the purchase order based on a set of data selected from the group consisting of: {a supplier contact info; a consignee contact info; a number of pieces being purchased; a purchase price per item; a currency of transaction; customs harmonized Codes for each item being purchased and/or shipped; Commercial Bill of Lading (B/L) Description of goods; Purchaser's sku #s of the goods; date of purchase order; INCO Terms; a desired mode of transport; a desired carrier; related parties (yes/no); an Importer's account number including Federal Tax ID#; binding ruling number; an ach payment type; OGA filing codes; and final delivery address and contact info}.

Referring still to FIG. 7, at the next step, the PIN# is used to control access to the new cargo shipment and to grant access to the new cargo shipment to a set of appropriate parties selected from the group consisting of: {at least one shipper; at least one custom broker; at least one forwarder; and at least one carrier} (step 146). The PIN# is also used to update a set of account data selected from the group consisting of: {an update to delivery address; an update to customs entry; an update in value; and other relevant updates that may occur while the cargo shipment is en route} (step 148). Finally, an audit trail is established with each update of the account data to specifically identify a party which is responsible for the relevant updates, or to specifically identify a party which authorized the relevant updates (step 150).

The step of generating a commercial invoice by the shipper further comprises the step (not shown) of confirming a set of data selected from the group consisting of: {a supplier contact info; a consignee contact info; a number of pieces being shipped; a sales price per item and a total price; a currency of transaction; a commercial Bill of Lading (B/L) description of goods; seller's sku #s of the goods; a date of invoice; INCO Terms; a mode of transport; a type of packaging units of measure; a SWP declaration; a net weight/gross weight/volume; a number of containers; a type of equipment; a seal number; a vessel; a voyage #; a SCAT code; BL#s; and a country of origin per item}.

The step of generating a manifest transmission & Bill of Lading (B/L) info by said carrier and/or a freight forwarder further comprises the following steps (not shown): sending a manifest to Customs and Border Protection (CBP) and initiating data for Bill of Lading (B/L) and Arrival Notice by specifying a set of data selected from the group consisting of: {a port of Lading: a port of Unlading; a place of delivery; IT #s and dates; and bonded carrier details}; and confirming arrival of said cargo shipment at loading pier by using a Smart Container lock/Strongbox device.

Figure 8:
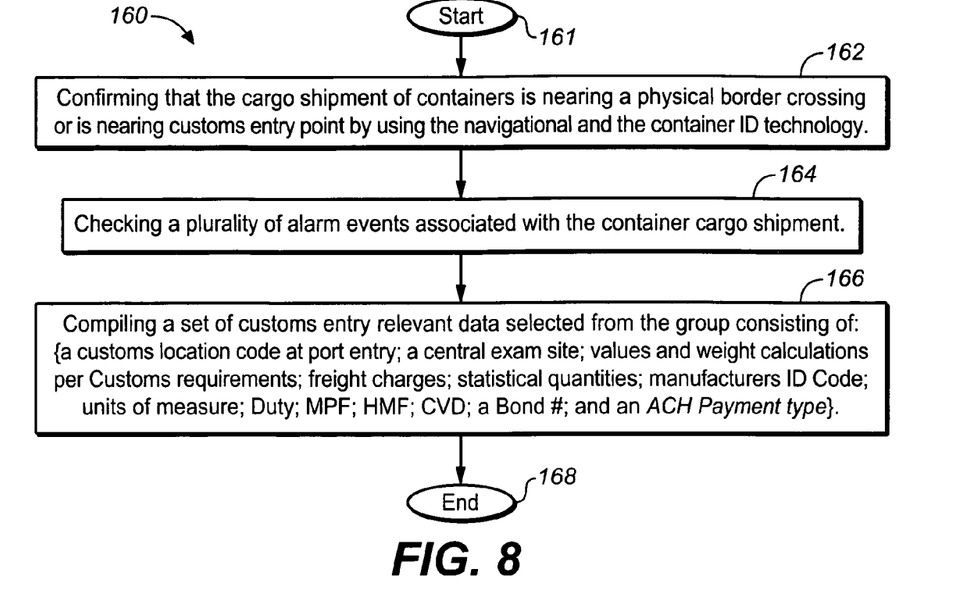
FIG. 8 illustrates a flow chart that shows the step of generating a signal to trigger transmission of customs entry by the website/portal of the ERP website-based system when a cargo container is within a predetermined length of time away from arrival at a physical border.

FIG. 8 illustrates a flow chart 160 that shows the step of generating a signal to trigger transmission of customs entry by the website/portal of the ERP website-based system when a cargo container is within a predetermined length of time away from arrival at a physical border. More specifically, the flow chart 160 of FIG. 8 comprises the following steps: (step 162) confirming that the cargo shipment of containers is nearing a physical border crossing or is nearing customs entry point by using the navigational and the container ID technology; (step 164) checking a plurality of alarm events associated with the container cargo shipment; and (step 166) compiling a set of customs entry relevant data selected from the group consisting of: {a customs location code at port of entry; a central exam site; values and weight calculations per Customs requirements; freight charges; statistical quantities; manufactures ID Code; units of measure; Duty; MPF; HMF; CVD; a Bond #; and an ACH Payment type}.

The step of checking the plurality of alarm events associated with the container cargo shipment further comprises the step (not shown) of increasing the frequency of periodically checking alarm events associated with the SST signals when the cargo ship approaches an arrival port.

For example, the user gets to define how often a data sample is taken. The sample rate can be taken from a variety of options, starting with once per day, but leaving open the options to tailor the testing based on proximity to harbor, port, or land.

The step of checking the plurality of alarm events associated with the container cargo shipment could comprise the step (not shown) of programming the frequency of periodically checking alarm events associated with the SST signals to take into account nearing approach to a harbor.

For example, one would like to include the programmable capability of altering the test sample rate, or period, to take account of a nearing approach to a harbor where further unloading and possibly additional testing might be performed. The tests could be done on a more regular basis as one gets to prescribed distances from the harbor: 10 miles, 5 miles, 2 miles 1 mile, 0.5 mile, 0.3 mile, 0.1 mile. So, while at sea, the test are done at the rate of "one test per week," the rate of testing would increase to "one test per day" as the ship gets to within 100 miles of a destination port.

In one embodiment of the present invention, the step of checking the plurality of alarm events associated with the container cargo shipment further comprises the step (not shown) of unloading of additional testing to be performed as the ship is within the 12 mile international water boundary limit of any country, whether a destination country or not. Indeed, additionally, tests should be performed more often as the ship gets to within the 12 mile international water boundary limit; i.e., gets to within territorial waters of any country, whether a destination country or not.

Figure 9:
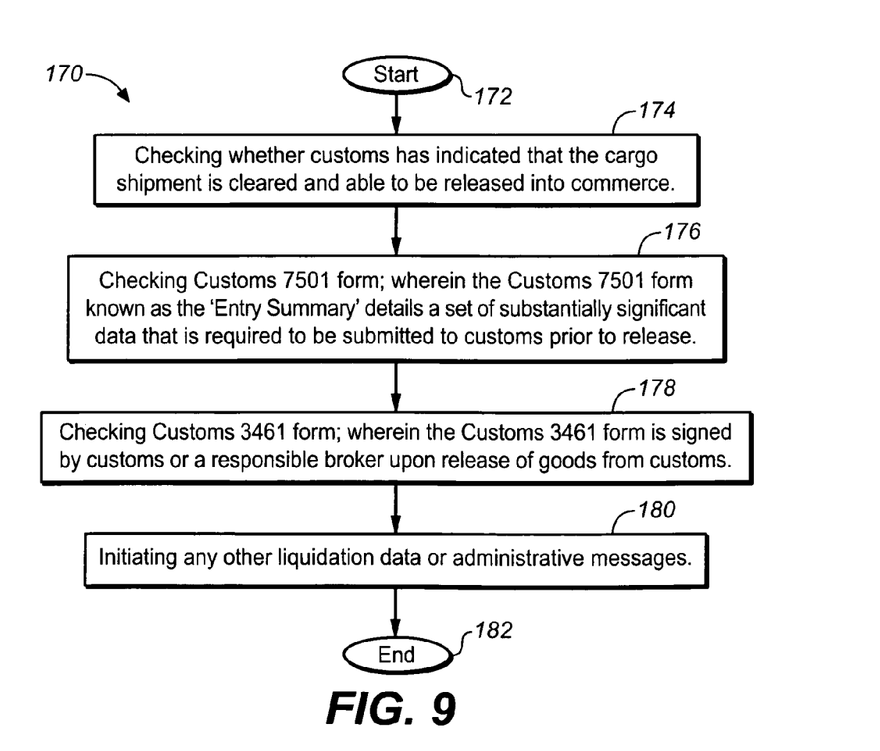
FIG. 9 depicts a flow chart that details the step of disseminating the customs release data to appropriate parties by customs via the website/portal of the ERP website-based system.

FIG. 9 depicts a flow chart 170 that details the step of disseminating the customs release data to appropriate parties by customs via the website/portal of the ERP website-based system. The flow chart 170 comprises the following steps: (step 174) checking whether customs has indicated that the cargo shipment is cleared and able to be released into commerce; (step 176) checking Customs 7501 form; wherein the Customs 7501 form known as the 'Entry Summary' details a set of substantially significant data that is required to be submitted to customs prior to release; (step 178) checking Customs 3461 form; wherein the Customs 3461 form is signed by customs or a responsible broker upon release of goods from customs; and (step 180) initiating any other liquidation data or administrative messages.

The step of disseminating the cargo release data by the carrier and or by the freight forwarders to an appropriate party via the website/portal further comprises the step (not shown) of disseminating the cargo released data in a method similar to the current Automated Manifest System (AMS).

The Disclosed Above, Secure ERP Website-Based System Achieves the Following Goals:

(A) To create a single source for data collection, transmission, review.

(B) To expand and improve the C-TPAT, Automated Commercial Environment (ACE), Container Security Initiative (CSI), Operation Safe Commerce (OSC), and other US Customs programs.

(C) To advance the realization and utilization of "Smart Container" Technology.

(D) To allow governments to conclusively pre-determine if a container needs to be physically inspected and fast track release of cargo into commerce.

(E) To streamline, standardize, and automate the documentation processes and prevent errors.

(F) To keep the balance between gathering of intelligence and flow of commerce.

(G) To expedite customs and OGA (Other governmental agency) entry processing.

(H) To reduce re-keying of data and create efficiencies.

(I) To create an audit trail of documentation.

(K) To allow consignee to 'drive' data on customs entry (Informed Compliance), Bills of lading, Arrival notices.

(J) To allow customs and OGAs to verify redundancy in data and to better identify at-risk cargo shipments.

(L) To eventually allow electronic nesting of information from supply chain and produce "Census Data" for customs analysis.

(M) To eventually tie in RFID technology with container manifesting and clearance processes.

(N) To allow Customs to "Fast Track" C-TPAT clients and their cargo shipments.

(S) To interface with logistics and enterprise resource systems to provide greater visibility into supply chains and inventories.

(T) To give importers and exporters greater planning and control of costs.

The Implementation of the Disclosed Above, Secure ERP Website-Based System (1) First target will be repetitive ocean cargo shipments and NAFTA truck border crossings for Pre-Arrival Processing System (PAPS) and for the Free And Secure Trade (FAST) programs.

(2) The first step—generation of the commercial documentation.

(3) The next step—Manifest generation.

(4) The following step—generation of the Bill of Lading (B/L) and generation of the Arrival notices.

(5) The next step—obtaining the Customs clearance.

(6) The following step—obtaining clearance from Other Governmental Agencies.

(7) The next step—to guarantee the trade financing.

(8) The system of the present invention could be used as a model for other collaborative documentation process applications.

The foregoing description of specific embodiments of the present invention has been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of tracking and processing at least one cargo container having an indefinite security status (ISS) comprising:
(A) detecting at least one statistically significant threat (SST) signal associated with at least one cargo container while in transit; wherein each said SST signal generates a threat signal having a threat probability higher than a predetermined threshold;
(B) if at least one said SST signal associated with at least one said cargo container while in transit was detected, identifying each said cargo container that generated at least one said SST signal and classifying the security status of each said cargo container as a Potential Threat (PT) cargo container;
(C) substantially continuously checking said at least one generated SST signal to verify the security status of said at least one PT container while in transit;
(D) if at least one said SST signal is confirmed to be a false positive SST signal, changing the security status of said at least one PT container associated with said false positive SST signal to said indefinite security status (ISS) cargo container;
and
(E) tracking and reporting position coordinates and said security status of each said ISS PT cargo container to an appropriate party; wherein said appropriate party is selected from the group consisting of: {Homeland Security agency; and a cargo security agency}.

2. The method of claim 1, wherein said step (A) further comprises:
(A1) detecting said at least one statistically significant threat (SST) signal associated with at least one cargo container while in transit by using an active probing method.

3. The method of claim 1, wherein said step (A) further comprises:
(A2) detecting said at least one statistically significant threat (SST) signal associated with at least one cargo container while in transit by using at least one passive threat detection device.

4. The method of claim 1, wherein said step (C) further comprises:
(C1) increasing the frequency of periodically checking alarm events associated with each said PT container while in transit.

5. The method of claim 1, wherein said step (C) further comprises:
(C2) programming the frequency of periodically checking alarm events associated with each said PT container while in transit.

6. The method of claim 1, wherein said step (D) further comprises:
(D1) setting a set of threshold numbers;
and
(D2) determining an integer $N_{inspected}$ of ISS containers to be inspected depending on the relationship between an integer K of said ISS containers and each said threshold number.

7. The method of claim 6; wherein said step (D1) further comprises:
(D1, 1) setting a set of threshold numbers $\{N_{threshold1}; N_{threshold2}; N_{threshold3}; \ldots N_{threshold(L-1)}; N_{thresholdL}\}$; L being an integer;

and wherein said step (D2) further comprises:
- (D2, 1) determining said number of containers $N_{inspected}$ to be inspected depending on the relationship between said K number of ISS containers and each said threshold number, wherein said $N_{inspected}$ is equal to zero if said K number is less than or equal to said first threshold number $N_{threshold1}$; and wherein said $N_{inspected}$ is equal to said first threshold number $N_{threshold1}$ if said K number is less than or equal to said second threshold number $N_{threshold2}$; and wherein said $N_{inspected}$ is equal to said second threshold number $N_{threshold2}$ if said K number is less than or equal to said third threshold number $N_{threshold3}$; and wherein said $N_{inspected}$ is equal to said (L−1) threshold number $N_{threshold(L-1)}$ if said K number is less than or equal to said last threshold number $N_{thresholdL}$.

8. The method of claim 1, wherein said step (E) further comprises:
- (E1) using a secure expedite said release procedure (ERP) website-base system to track the status of each said ISS container; wherein said secure ERP website-based system is configured to collect and to process a set of combined data selected from the group consisting of: {a set of normal commercial transaction data; a set of transport data; a set of RFID data; a set of satellite navigational tracking data; a set of threat signal data; and a set of security status data}; wherein said set of combined data is a collection of inputs from a supply chain selected from the group consisting of: {each said container entering said at least one border crossing or at said at least one customs entry point; said customs at said at least one destination country; a network of shippers; a network of consignees; a network of forwarders; a plurality of terminals; and a network of carriers}.

9. The method of claim 8, wherein said step (E1) further comprises:
- (E1, 1) utilizing said set of data selected from the group consisting of: {said RFID data; said set of satellite navigational tracking data; and said set of threat signal data} to indicate a physical location of at least one said ISS cargo container that will be submitted for customs clearance within a predetermined distance and time of arrival from a port of discharge and/or port of entry, wherein each said ISS cargo container has generated at least one said previously undetected SST (PUSST) signal.

10. The method of claim 8, wherein said step (E1) further comprises:
- (E1, 2) posting the current location of each said ISS cargo container on said secure ERP website.

11. The method of claim 8, wherein said step (E1) further comprises:
- (E1, 3) physically inspecting a predetermined number of said ISS cargo containers in said cargo shipment at least one border crossing or at least one customs entry point or at port of customs entry.

12. The method of claim 11, wherein said step (E1, 3) further comprises:
- (E1, 3, 1) performing at least one additional physical testing at a ship that includes said at least one ISS container, wherein said ship is located within the 12 mile international water boundary limit of any country, whether a destination country or not.

13. A method of tracking and reporting position coordinates and security status of an Expedited Release Procedure (ERP) cargo container that changed its status to an ISS cargo container while in transit to an appropriate party; said method comprising:
- (A) substantially continuously checking the security status of each said ERP container while in transit by using at least one threat detector to detect a previously undetected (PU) SST signal;
- (B) if at least one ERP container generates a previously undetected (PU) SST signal, changing the security status of said at least one ERP container associated with said (PU) SST signal to an indefinite security status (ISS) cargo container; and
- (C) tracking and reporting position coordinates and said security status of each said ISS cargo container associated with said (PU) SST signal to an appropriate party; wherein said appropriate party is selected from the group consisting of: {Homeland Security agency; and a cargo security agency}.

14. The method of claim 13, wherein said step (A) further comprises:
- (A1) detecting said at least one (PU) SST signal associated with at least one cargo container while in transit by using an active probing method.

15. The method of claim 13, wherein said step (A) further comprises:
- (A2) detecting said at least one (PU) SST signal associated with at least one cargo container while in transit by using at least one passive threat detection device.

16. The method of claim 13, wherein said step (B) further comprises:
- (B1) activating at least one RFID tag associated with said (PU) SST signal to indicate the change in the classification of at least one cargo container from said ERP security status to said ISS security status; and
- (B2) generating an alarm signal when said at least one ERP container changes its security status from said ERP security status to said ISS security status.

17. The method of claim 13, wherein said step (C) further comprises:
- (C1) using a secure expedite said release procedure (ERP) website-base system to track the status of each said (PU) ISS container; wherein said secure ERP website-based system is configured to collect and to process a set of combined data selected from the group consisting of: {a set of normal commercial transaction data; a set of transport data; a set of RFID data; a set of satellite navigational tracking data; a set of threat signal data; and a set of security status data}; wherein said set of combined data is a collection of inputs from a supply chain selected from the group consisting of: {each said container entering said at least one border crossing or at said at least one customs entry point; said customs at said at least one destination country; a network of shippers; a network of consignees; a network of forwarders; a plurality of terminals; and a network of carriers}.

18. The method of claim 17, wherein said step (C1) further comprises:
- (C1, 1) utilizing said set of data selected from the group consisting of: {said RFID data; said set of satellite navigational tracking data; and said set of threat signal data} to indicate a physical location of at least one said (PU) ISS cargo container that will be submitted for customs clearance within a predetermined distance and time of arrival from a port of discharge and/or port of entry.

19. The method of claim 17, wherein said step (C1) further comprises:
- (C1, 2) posting the current location of each said (PU) ISS cargo container on said secure ERP website.

20. The method of claim 17, wherein said step (C1) further comprises:
 (C1, 3) physically inspecting a predetermined number of said (PU) ISS cargo containers in said cargo shipment at least one border crossing or at least one customs entry point or at port of customs entry.

* * * * *